United States Patent
Alber et al.

(10) Patent No.: US 8,121,322 B2
(45) Date of Patent: Feb. 21, 2012

(54) METHOD FOR IDENTIFYING HEARING AIDS WITHIN THE SCOPE OF WIRELESS PROGRAMMING

(75) Inventors: Daniel Alber, Erlangen (DE); Jamil Ismail, Nürnberg (DE); Gottfried Rückerl, Nürnberg (DE); Gunter Sauer, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1226 days.

(21) Appl. No.: 11/825,072

(22) Filed: Jul. 3, 2007

(65) Prior Publication Data
US 2008/0013764 A1 Jan. 17, 2008

(30) Foreign Application Priority Data
Jul. 3, 2006 (DE) .......................... 10 2006 030 602

(51) Int. Cl.
*H04R 25/00* (2006.01)
(52) U.S. Cl. ........................ 381/315; 370/329; 381/60
(58) Field of Classification Search .................. 381/315, 381/60
See application file for complete search history.

(56) References Cited

U.S. PATENT DOCUMENTS

| 5,210,803 | A | 5/1993 | Martin et al. |
| 7,174,026 | B2 | 2/2007 | Niederdränk |
| 7,639,828 | B2 * | 12/2009 | Platz ............................ 381/315 |
| 2007/0184837 | A1 * | 8/2007 | Hohl et al. ................. 455/435.1 |

FOREIGN PATENT DOCUMENTS

| DE | 102 01 068 A1 | 7/2003 |
| EP | 0 480 097 B1 | 4/1992 |
| EP | 1 638 367 A2 | 3/2006 |

* cited by examiner

*Primary Examiner* — Jerome Jackson, Jr.
*Assistant Examiner* — Dale E Page

(57) ABSTRACT

A method for identifying hearing aids is described wherein a wireless connection is established between a control device and at least one unidentified hearing aid, and which comprises the following procedural steps: a request is sent by the control device to at least one unidentified hearing aid; the request is received by the hearing aid addressed; a response is provided in the hearing aid addressed, whereby the response contains an individual identifier of the respective hearing aid; and the response is sent by the hearing aid addressed to the control device, whereby the response is transmitted at a point in time that is individually determined by the responding hearing aid.

17 Claims, 2 Drawing Sheets

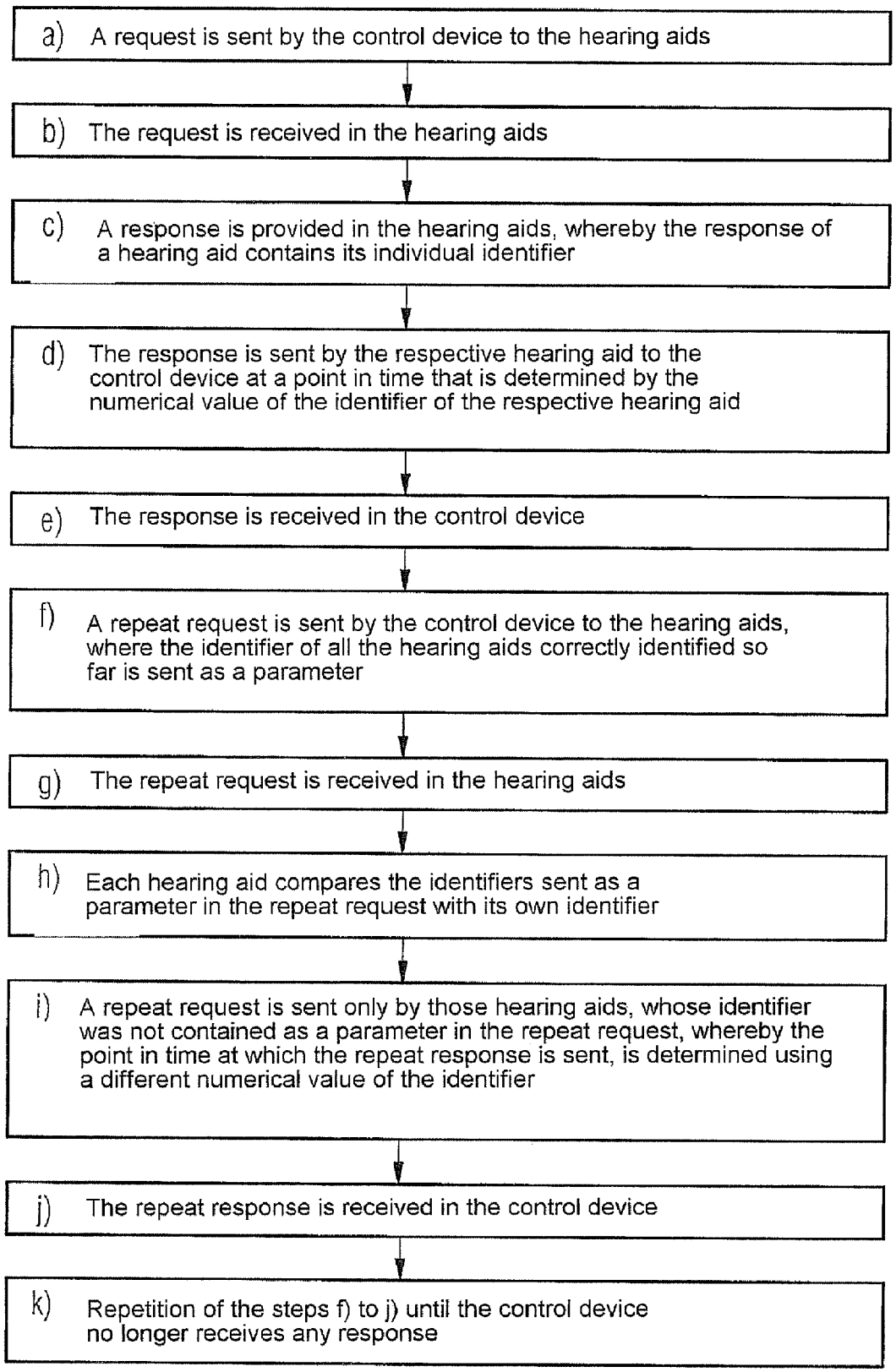

METHOD FOR IDENTIFYING HEARING AIDS WITHIN THE SCOPE OF WIRELESS PROGRAMMING

CROSS REFERENCE TO RELATED APPLICATIONS

This application claims priority of German application No. 10 2006 030 602.3 filed Jul. 3, 2006, which is incorporated by reference herein in its entirety.

FIELD OF THE INVENTION

The invention relates to a method for identifying hearing aids within the scope of a wireless connection between a control device and several hearing aids. In order to prevent the response signals of several hearing aids to a request of the control device from colliding, the hearing aids send their responses using an individual default setting.

BACKGROUND OF THE INVENTION

Hearing aids are used to restore or to improve the hearing capabilities of people with hearing impairments. Whereas earlier hearing aids were frequently designed only as amplifiers for all ambient noises around the hearing aid user, modern hearing aids are able to filter and amplify the noises according to the individual requirements of the hearing aid user. The use of digital technology in particular opens up enormous possibilities in this field. A hearing aid must be programmed using an external control device with the hearing aid acoustician in order to adjust it to the individual requirements of its user. By playing audio examples to the hearing aid user, it is possible to conclude how effective the existing hearing aid settings are and whether a further adjustment of the hearing aid is required. In future, audio examples can be input via the programming device. However, until now they have been and probably still will be in the future predominantly played back via an external loudspeaker system.

Until now hearing aids have been connected directly to the programming device or to an interconnected device, e.g. a remote control, almost exclusively by means of a special cable, for programming. Thereby a cable connection is provided for each hearing aid respectively. The individual cabling ensures that the assignment of the hearing aid in the programming device is unequivocal and therefore each connected hearing aid can be responded to individually. A separate cabling is particularly necessary when programming pairs of hearing aids (binaural coverage), as in this case it may be necessary to make different settings for the right and the left hearing aid.

If, however, the connection of the hearing aids to the control device is carried out completely wirelessly, then problems can arise in particular in the connection setup, as here to start with the hearing aids are not assigned unequivocally. Right from the start the programming device does not have the knowledge as to how many hearing aids are present and if a pair of hearing aids are to be programmed, possibly also the knowledge as to which of the hearing aids present are meant for the left or the right ear. Therefore, a method of recognition with whose help the hearing aids present can be unequivocally assigned is necessary in particular for the programming of pairs of hearing aids realized via a wireless connection made via the same radio channel.

The problem of there being no assignment of hearing aids in a control device can, however, also arise e.g. during the function test and pre-adjustment of the hearing aids directly after their manufacture, as it is precisely here that a large number of hearing aids are tested or pre-adjusted at the same time. Since the control device must know both the number and also the identity of the individual hearing aids in order to carry out a function test, until now the hearing aids for these test and pre-adjustment procedures have to be connected manually to the control device via cable connections. If, however, the connection of the hearing aids to the control device is to be done using a wireless connection, then a procedure for recognition using which the control device can recognize the number and the identity of the hearing aids present must also be provided.

SUMMARY OF THE INVENTION

The object of the invention is, therefore, to provide, on the basis of this prior art, a method to enable identification of individual hearing aids during the setup of a wireless connection between a control device and at least one hearing aid not known to the control device. This object is achieved by a method with the features according to the claims. Further advantageous embodiments of the invention are given in the subordinate claims.

According to the invention, a method for identifying hearing aids is provided, wherein a wireless connection is set up between a control device and at least one unidentified hearing aid. Thereby, in order to identify the hearing aid, data is transmitted wirelessly in consecutive time slots. Provision is made in a first step for a request to be sent from the control device to at least one unidentified hearing aid. This request is received by the hearing aid addressed. In reaction to the request, a response is provided in the hearing aid addressed, which response contains an individual identifier of the hearing aid addressed. The hearing aid addressed subsequently sends this response to the control device. Thereby, advantageously, the response is sent at a point in time that is determined individually by the responding hearing aid. The determination of the transmission point in time according to an individual default setting increases the probability that the responses of several hearing aids are transmitted to the control device at different points in time. By this means the risk of a collision of the responses is reduced.

In an advantageous embodiment of the invention, a multi-digit identification number serves as an identifier for the hearing aid, which identification number is made up of at least in part of a serial number unequivocally assigned to the respective hearing aid or of a random number generated in the respective hearing aid. With the help of the serial number and also with the help of the random number generated in the hearing aid, the respective hearing aid can be individually assigned in the control device.

In a further advantageous embodiment of the invention, each hearing aid determines the transmission point in time for its response using its own identification number. As the identification number differs from hearing aid to hearing aid, the risk of a collision can thus be noticeably reduced.

In an alternative embodiment of the invention each hearing aid determines the transmission point in time for its response using a random number generated in the hearing aid. In this way the risk of a collision can also be effectively reduced if a unique serial number is not available.

Further, in an advantageous embodiment of the invention, the transmission point in time of the response is determined using a specific part of the identification number. This enables the time frame for the transmission to be limited as required. In particular, when data is transmitted in consecutive time slots this can noticeably shorten the procedure for recognition. Further, using only a part of the identification number in order to determine the transmission point in time opens up the possibility, that in the event of a transmission being repeated, the transmission point in time of the response is determined using another part of the identification number. Thus the probability of a repeat collision of the responses can be noticeably reduced.

In another advantageous embodiment of the invention, in the case that the control device sets up a wireless connection to at least two hearing aids, the control device again sends a request to the hearing aids if said control device has not received the response of at least one of the hearing aids correctly. Subsequently the hearing aid whose response was not received correctly sends its response to the control device again. As collisions of the response signals cannot be totally avoided, it must be ensured that all hearing aids are recognized by repeating the procedure. If the repeat request additionally contains feedback as to which hearing aids were already correctly recognized by the control device, it is possible to ensure that subsequently only those hearing aids that have not yet been correctly recognized by the control device send a response again. Hereby the transmission channel is kept free exclusively for the responses of the hearing aids that have not yet been recognized. The risk of a collision is further reduced. By sending the identifier of the already recognized hearing aids in the repeat request of the control device, it is possible to ensure in a particularly simple way that a hearing aid subsequently only sends a response again if its identifier is not yet recognized in the control device.

In a further advantageous embodiment of the invention the control device keeps repeating its request until it no longer receives any response to its request. Using this approach increases the certainty that the control device identifies all the hearing aids present in its transmission range.

Further, in another embodiment of the invention, the hearing aids are identified during the wireless programming of the hearing aids. As it is with the wireless programming in particular that there is no fixed assignment of the devices to each other, using this method ensures that the programming device can address and program the hearing aids individually. As when hearing aids are programmed individually, a maximum of two hearing aids can be programmed at the same time, it is recommended that the control device ends its requests as soon as it has recognized two hearing aids correctly.

In a particularly advantageous embodiment of the invention data is transmitted wirelessly in consecutive time slots in order to identify the hearing aid, and the response is transmitted in a time slot whose transmission point in time is determined individually by the responding hearing aid. Through the sharp delimitation that a time slot has in a transmission framework, the probability of a chronological crossover of the response signals of different hearing aids is noticeably reduced.

BRIEF DESCRIPTION OF THE DRAWINGS

The invention is now explained in more detail using drawings.

FIG. 3 shows a schematic flow chart of the method according to the invention.

DETAILED DESCRIPTION OF THE INVENTION

Figure 1:
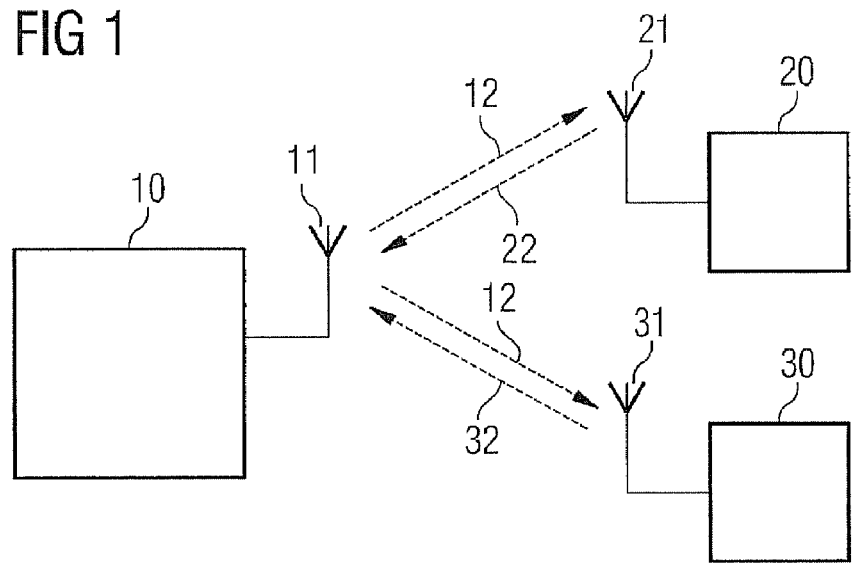
FIG. 1 shows a schematic representation of the setup of a wireless connection between a control device and two hearing aids.

FIG. 1 shows a schematic representation of an arrangement consisting of a control device 10 and two hearing aids 20, 30. Such an arrangement occurs, for example, when a pair of hearing aids is programmed simultaneously in the case of binaural coverage. In this way a connection is established between two hearing aids 20, 30 and a control device 10. In contrast to the cable connections known from prior art, the two hearing aids 20, 30 are connected to the control device 20, 30 via a wireless bi-directional connection. This is indicated in FIG. 1 by the broken arrows. In addition, the hearing aids 20, 30 and the control device 10 have corresponding devices, which devices are merely indicated by antenna 11, 21, 31 on the devices 10, 20, 30. Digital short-range transmission methods are especially suited to wireless connection. In principle, however, it is possible to connect the hearing aids 20, 30 to the control device 10 via different wireless transmission methods.

As an alternative to the constellation shown in FIG. 1, the two hearing aids 20,30 can also be connected to the control device 10 indirectly via an interconnected device, like, for example, via a remote control, whereby the wireless connection is then set up between the remote control and the hearing aids 20,30. Again the remote control can be connected to the control device 10 wirelessly or by means of a special cable.

When the control device 10 establishes the connection to the two hearing aids 20,30 for the first time, it does not yet know how many hearing aids 20,30 are within its range and possibly which of these hearing aids 20,30 is meant for the left ear and which for the right ear. In order to enable the hearing aids 20, 30 to be unequivocally recognized and unequivocally assigned in the control device 10, the hearing aids 20, 30 must identify themselves to the control device 10. To this end, the control device 10 uses a general request to prompt all hearing aids 20, 30, to send it an individual identifier. As the control device 10 at first does not know the hearing aids 20, 30 that are present, it cannot yet address the hearing aids 20, 30 individually. Rather the first prompt is directed at all hearing aids 20, 30 that are within the range of the control device 10. A requirement for the implementation of the identification procedure via the wireless connection is that the participating hearing aids 20, 30 are within the transmission range of the control device 10 and are activated to receive on the corresponding transmission channel.

As soon as a hearing aid 20, 30 has received the identification prompt of the control device 10, it provides a corresponding response. This response contains an identifier individually assigned to the relevant hearing aid 20, 30. The identifier is preferably made up of a numeric or alphanumeric character string. Here it is a unique identification number, such as, for example, a serial number or a random number generated in the hearing aid 20, 30. While the serial number was already assigned to the hearing aid during its manufacture, the random number can be generated in the hearing aid when required. To this end different methods are known. It is also possible to provide an identification number that does not consist of the serial number or the random number, but is formed out of both numbers. An identifier for identification generated in the hearing aid 20, 30 must be interlocked with the control device 10 for further communication. This ensures that the assignment of the relevant hearing aid 20, 30 made on the basis of this identifier is maintained until the end of the session. To this end, the identifier can, for example, be stored in a special storage device of the relevant hearing aid 20, 30.

In addition to the actual identifier, the response can contain further components that are preset in particular by the respective transmission methods. Reference is only made by way of example to so-called header information, said header information being used in block transmission of data and which forms the start of a data packet.

In response to the request, each hearing aid 20, 30 that has been addressed now sends its response to the control device 10. If, as is the case in this example, more than one hearing aid 20, 30 responds to the request of the control device 10 at the same time, this can result in the response signals colliding. As all the hearing aids 20, 30 send their responses preferably on the same channel, the probability is quite high that, as a result, not all the responses are received correctly by the control device 10. In this case, the entire procedure must be repeated, whereby there is then also quite a high probability that the control device 10 cannot correctly receive all the responses of the hearing aids 20, 30 that have been addressed because of collisions.

The repetition of the identification procedure necessary for at least some of the participating hearing aids 20, 30 because of the response signal collision results in an undesirable delay in the establishment of the connection. In addition there is also the danger that hearing aids are wrongly recognized as the control device 10 receives distorted response signals. Thus a faster and more secure establishment of a connection between the control device 10 and the hearing aids 20, 30 requires that the risk of such collisions is reduced. This is achieved according to the invention by sending the responses of the different hearing aids 20, 30 one after the other, so that the control device 10 can receive these without interference at different points in time.

To this end the hearing aids 20, 30 are to be designed in such a way that they do not send their responses directly after the receipt of the request but after a delay. Thereby the delay must be determined individually for each hearing aid 20, 30. This is preferably achieved by each hearing aid 20, 30 determining the transmission point in time of its response itself according to an individual default. Possible defaults for determining the transmission point in times are, for example, the identification number of the respective hearing aid 20, 30. As this identification number is formed according to the invention from a serial number or from a random number generated in the hearing aid 20, 30, there is a very high probability that it is different from hearing aid to hearing aid. Thereby the transmission point in time is preferably preset directly by a numerical value of the respective number. Alternatively, it is also possible to provide the determination of the transmission point in time using a character string independent of the identification number, such as, for example, a random number specifically generated for this.

In as far as in the wireless connection data is transmitted in consecutive time segments or time slots, the respective numerical value preferably determines the precedence of the corresponding time slot in which the response is to be transmitted. In order to speed up the establishment of the connection, preferably only a part of the correspondingly multi-digit identification number is used to determine the transmission point in time. If, for example, only the last digit of a multi-digit decimal identification number is used, then there are 10 time slots available for the transmission of a response. In the case of two hearing aids 20, 30 addressed at the same time, there is a probability of 9:1 that the recognition will, therefore, be achieved without collision. In other words, the undesirable collision of the response signals only occurs in one out of ten cases. If the identification number is represented in a non-decimal number system, e.g. as an octal or hexadecimal digit, different probabilities of a collision result accordingly (7:1 or 15:1).

In as far as the risk of a collision of the responses is to be further reduced, instead of the lowest digit one could bring in the last two digits of the serial number to determine the transmission point in time. With a decimal serial number, there would, in such a case, be exactly 100 time slots available for the transmission of a response. Consequently there would be a probability of 99:1 that the recognition would be achieved without collision.

As the serial numbers permanently programmed into the hearing aids 20, 30 frequently only differ from each other in the last digits, in such a case it is recommended above all to use these digits of the identification number to determine the transmission point in time.

As explained earlier, the probability of several response signals interfering with each other can be noticeably reduced by setting the transmission points in time individually. Nevertheless, in some few cases it can still happen that two or several hearing aids 20, 30 respond at the same time. Then the identification procedure must be repeated in full. However, when several response signals collide it can also happen that one of the colliding responses is correctly received by control device 10. An error recognition method can be used as a criterion for the recognition of a collision or faulty transmission. In this case, it must also be clarified whether only one hearing aid 20, 30 has responded or whether the response of another hearing aid was obscured by the simultaneous response of the recognized device. To this end, the control device 10 sends another request to all the hearing aids 20, 30 that are within its range. To avoid an already recognized hearing aid (or hearing aids) responding to this repeat request, the control device 10 sends the identification numbers of all the hearing aids recognized up to now as a parameter together with its repeat request. When this request is received by one of the hearing aids 20, 30, said hearing aid checks whether its identification number is included in the parameters of the repeat request. If this is the case, the hearing aid 20, 30 in question thus recognizes that its identity is already known to the control device 10 and that it should therefore no longer respond to the current request. In this way the receiving channel is kept free for the hearing aids 20, 30 that are not yet known, so that their responses can now be received with less interference.

If, when comparing its identification number with the numbers sent in the current request, a hearing aid 20, 30 determines that its identity is not yet known to the control device 10, then it sends its response to the control device 10 again. In order, in the repeat attempt at identification, to avoid a possible collision of the responses of further hearing aids 20, 30 that were also not recognized by the control device 10 on the first attempt, the relevant hearing aids 20, 30 now preferably use a different part of their identification number to determine the transmission point in time for their response. For example, respectively the next number up or the next numbers up of the identification number can be used.

If necessary, the procedure is repeated until all the hearing aids 20, 30 have been correctly recognized by the control device 10. If there is no reply in response to a repeated request, the control device 10 can then assume that it has recognized all the hearing aids 20, 30 in its range correctly and that there is no need for further requests.

In the further communication, e.g. for the purposes of programming, the control device 10 will address each hearing aid 20, 30, individually with its identifier. At the same time, data that is sent from a hearing aid 20, 30 to the control device 10 can be unequivocally assigned to the respective hearing aid 20, 30 via the identifier sent with the data.

During the programming of hearing aids, as a rule a maximum of two hearing aids 20,30 are individually adjusted to the hearing capability of the user by means of a control device 10 designed as a programming device. Therefore, the procedure for recognition is then already ended when the programming device 10 has recognized two hearing aids 20, 30 correctly. In as far as two hearing aids 20, 30 were recognized and can now be addressed individually, there must still be clarification as to which side of the head a hearing aid has been placed. This can be carried out for instance by the programming device 10 sending a command to generate an acoustic signal wirelessly to one of the two hearing aids 20, 30. Alternatively, an acoustic signal can also be transmitted directly from the programming device 10 via the wireless connection to the respective hearing aid 20, 30. This, however, requires a wireless connection that has a correspondingly high data transmission rate and supports audio transmission. In the most straightforward case, the sides can be determined by the hearing aid user giving feedback as to which of the two hearing aids 20, 30 has received the signal. The assignment of the hearing aids 20, 30 to the respective side of the head can then be carried out in the programming device 10 by manual input.

Figure 2:
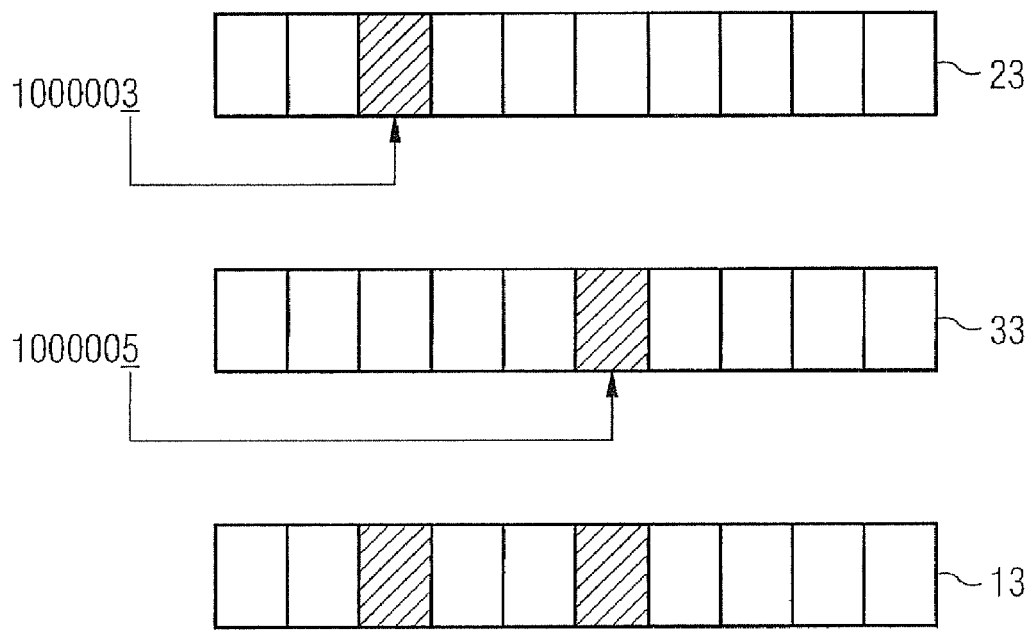
FIG. 2 shows a schematic representation of a possible distribution of the responses of different hearing aids into different time slots where the data transmission is carried out in blocks.

FIG. 2 shows an exemplary situation where a collision is effectively avoided using the method according to the invention. Thereby FIG. 2 shows a schematic representation of the response signals of two hearing aids 20, 30, which were addressed simultaneously by a control device 10. The first hearing aid 20 has, for example, the decimal serial number 1000003, whereas the second hearing aid has, for example, the decimal serial number 1000005. In the present example, the hearing aids 20, 30 use the last digit of their serial number to determine the transmission point in time for their response. As a result the hearing aids 20, 30 have altogether time slots 23, 33 available in which they can transmit their response to the control device 10. In accordance with the last digit of its serial number, the first hearing aid 20 sends its response in the third time slot, while the second hearing aid 30 only transmits its response in the fifth time slot. The control device 10 can recognize without interference both responses from the data stream 13 that it received.

The flow diagram shown in FIG. 3 illustrates the course of the method according to the invention whereby at least two hearing aids 20, 30 are identified by control device 10. Thereby the procedural steps f) to j) are repeated until all listening hearing aids 20, 30 in the range of the control device 10 were recognized correctly. In as far as only one hearing aid 20, 30 is designated for identification, the method can be ended already after procedural step e). If, however, it is to be ensured that there is no further hearing aid ready-to-receive in the range of the control device 10, the method of recognition is not ended until after procedural step j), namely when the control device 10 has not received any reply to its repeat request.

The above inventive method is not restricted to the exemplary embodiment described. In particular the invention can be applied to all data transmission methods, where a wireless connection is established between a control device 10 and one or several hearing aids 20, 30. In addition to known radio standards this also includes methods of the kind where the data is transmitted for example by inductive path or optically.

The invention claimed is:

1. A method for identifying a hearing aid being wirelessly connected with a control device, comprising:

sending a request by the control device to all unidentified hearing aids in a range of the control device;

receiving the request by all the unidentified hearing aids in the range;

providing a response by each of the unidentified hearing aids, the response comprising an identifier of the respective hearing aid;

determinining a point in time individually by each of the unidentified hearing aids at which the response is sent to the control device, wherein the point in time is determined by each unidentified hearing aid using identifier of the respective hearing aid or a character string independent of the identifier and sending the response by each of the unidentified hearing aids to the control device at the determined point in time.

2. The method as claimed in claim 1, wherein the point in time is determined using the identifier.

3. The method as claimed in claim 2, wherein the identifier is a multi-digit identification number and at least partly from a serial number unequivocally assigned to the hearing aid or from a random number generated in the hearing aid.

4. The method as claimed in claim 3, wherein the point in time is determined using a part of the identification number.

5. The method as claimed in claim 4, wherein a further point in time for a further response is determined using a different part of the identification number.

6. The method as claimed in claim 5, wherein the part of the identification number is last digits of the identification number and the different part of the identification number is next higher digits of the identification number.

7. The method as claimed in claim 1, wherein the point in time is determined using a character string that is independent of the identifier.

8. The method as claimed in claim 1, wherein the point in time is determined using a random number generated in the hearing aid.

9. The method as claimed in claim 1, wherein a plurality of hearing aids are wirelessly connected with the control device, wherein the control device repeats sending requests to those hearing aids from which the control device has not received correct responses, and wherein the hearing aids whose responses are not correctly received repeat sending responses to the control device.

10. The method as claimed in claim 9, wherein the repeating requests comprise a feedback message that identifies which hearing aids are correctly recognized by the control device, and wherein only the hearing aids that have not yet been correctly recognized by the control device repeat sending responses.

11. The method as claimed in claim 10, wherein the feedback message comprises the identifier of the hearing aids.

12. The method as claimed in claim 9, wherein the control device repeats sending the requests until no response from any of the hearing aids is received by the control device for the requests.

13. The method as claimed in claim 9, wherein the control device stops sending the request if all the hearing aids are correctly recognized.

14. The method as claimed in claim 9, wherein the responses are wirelessly transmitted in consecutive time slots.

15. The method as claimed in claim 14, wherein each of the time slots is individually determined by the responding hearing aid.

16. The method as claimed in claim 1, wherein the identification is performed within a scope of a wireless programming of the hearing device.

17. The method as claimed in claim 1, wherein the control device is a programming device.

* * * * *